United States Patent [19]
Duan et al.

[11] Patent Number: 6,017,998
[45] Date of Patent: Jan. 25, 2000

[54] STABLE AQUEOUS POLYURETHANE DISPERSIONS

[75] Inventors: Youlu Duan, Maplewood; Yi Wei, St. Paul; Yuduo Zhu, Woodbury; Sonja E. Stammler, Marine on the St. Croix; Brian L. Marty, Oakdale; Gary J. Haider, Maplewood; Ronald R. Davies, St. Paul; Michael J. Maksymkiw, White Bear Lake, all of Minn.

[73] Assignee: H.B. Fuller Licensing & Financing,Inc., St. Paul, Minn.

[21] Appl. No.: 09/098,897

[22] Filed: Jun. 17, 1998

[51] Int. Cl.⁷ .............................. C08J 3/00; C08K 3/20; C08L 75/00

[52] U.S. Cl. .................. 524/591; 428/423.1; 428/425.1; 428/425.8; 524/507; 524/839; 524/840; 525/123; 525/455; 525/902; 525/903

[58] Field of Search .................................. 524/591, 839, 524/840, 507; 525/123, 455, 902, 903; 428/423.1, 425.1, 425.8

[56] References Cited

U.S. PATENT DOCUMENTS

| | | |
|---|---|---|
| 3,624,020 | 11/1971 | Klebert et al. . |
| 3,684,758 | 8/1972 | Honig et al. . |
| 3,862,074 | 1/1975 | Hickey . |
| 4,574,147 | 3/1986 | Meckel . |
| 4,644,030 | 2/1987 | Loewrigkeit et al. . |
| 4,857,368 | 8/1989 | Klein . |
| 4,888,383 | 12/1989 | Huybrechts . |
| 5,095,069 | 3/1992 | Ambrose et al. . |
| 5,137,961 | 8/1992 | Goos et al. . |
| 5,331,039 | 7/1994 | Blum et al. .............................. 524/507 |
| 5,334,690 | 8/1994 | Schafheutle et al. . |
| 5,367,017 | 11/1994 | Rosthauser et al. . |
| 5,371,133 | 12/1994 | Stanley . |
| 5,523,344 | 6/1996 | Maksymkiw et al. . |
| 5,608,000 | 3/1997 | Duan et al. . |
| 5,610,232 | 3/1997 | Duan et al. . |
| 5,807,919 | 9/1998 | Duan et al. .............................. 524/501 |

FOREIGN PATENT DOCUMENTS

WO 93/04018  8/1991  WIPO .

OTHER PUBLICATIONS

"Handbook of Adhesives", Irving Sherst, 3rd Edition, Chapter 1, p. 18.

*Primary Examiner*—Patrick D. Niland
*Attorney, Agent, or Firm*—Nancy N. Quan

[57] ABSTRACT

The present invention discloses a stable aqueous polyurethane dispersions comprising a reaction product of a water dispersible isocyanate-terminated polyurethane prepolymer (A), an aqueous polyurethane dispersion (B) and water, and a method wherein a water dispersible isocyanate-terminated polyurethane prepolymer (A) is dispersed in at least one aqueous polyurethane dispersion (B) and water, and reacted at about 35° C. to about 95° C. until substantially free of isocyanate. The inventive dispersions are useful in adhesives, coatings, binders, primers and sizers.

21 Claims, 1 Drawing Sheet

Figure A. Number Average Particle Size (nm)
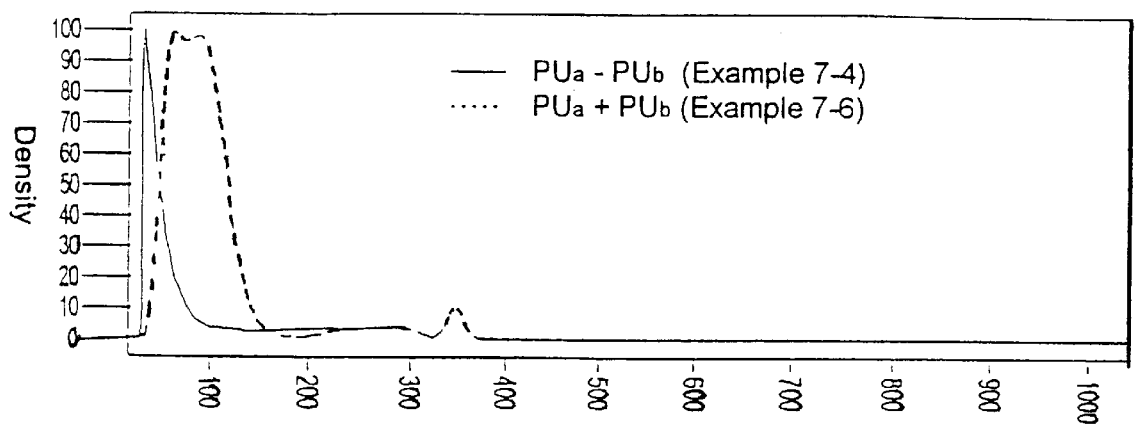
Figure B. Weight Average Particle Size (nm)
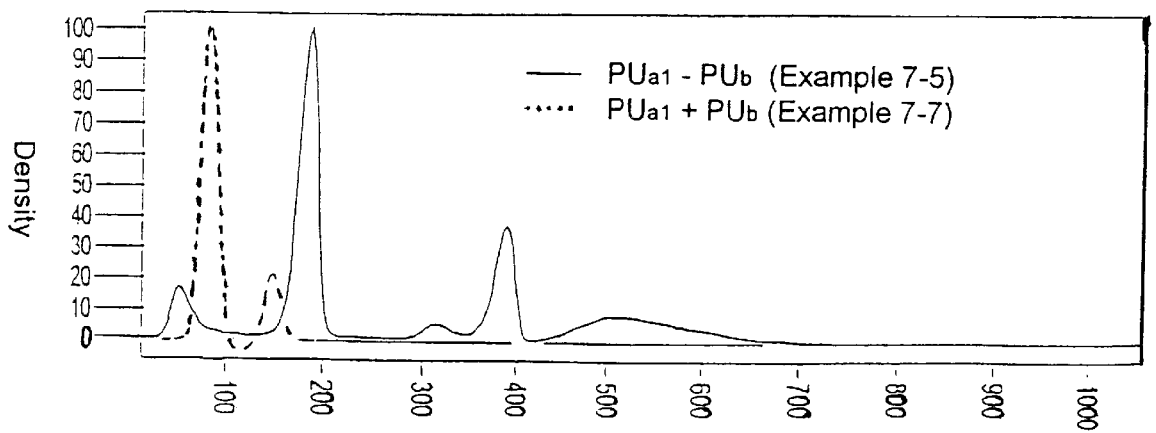

STABLE AQUEOUS POLYURETHANE DISPERSIONS

FIELD OF THE INVENTION

The invention relates to stable aqueous polyurethane dispersions. Specifically, it relates to a stable one-component aqueous polyurethane dispersion comprising a reaction product of at least one water dispersible isocyanate polyurethane prepolymer (A), at least one aqueous polyurethane dispersion (B) and water, and to a method for the preparation of the stable aqueous polyurethane dispersions wherein at least one water dispersible isocyanate-terminated polyurethane prepolymer (A) is dispersed in at least one aqueous polyurethane dispersion (B) and water, and reacted at about 35° C. to about 95° C. until substantially free of isocyanate. More specifically, it relates to a stable aqueous polyurethane dispersion comprising polyurethane (A)/polyurethane (B) graft and core (polyurethane B)/shell (polyurethane A) polymer which are useful as adhesives, coatings, binders, primers and sizers.

BACKGROUND OF THE INVENTION

Two-component aqueous polyurethane dispersion which comprises an aqueous polyurethane dispersion and a water dispersible crosslinker, such as a water dispersible polyisocyanate or water dispersible isocyanate terminated urethane prepolymer are known.

U.S. Pat. No. 5,334,690 (Schafheutle et al.) discloses sulfonated and/or carboxylated polyurethane dispersions which may be crosslinked with water-emulsifiable prepolymers having terminal isocyanate groups. The reference further discloses that the crosslinking agents are those customarily used in the paint industry.

U.S. Pat. No. 4,574,147 (Meckel) discloses a process for the preparation of polyurethane dispersions wherein polyurethane dispersions containing terminal amine groups are crosslinked with an NCO-terninated polyurethane prepolymer formed from diisocyanates, triols and polyols.

U.S. Pat. No. 5,367,017 (Rosthauser et al.) discloses a process wherein a polyisocyanate is dispersed in water and subsequently reacted with a high molecular weight diamine. A suitable polyamine includes those obtained by hydrolyzing isocyanate-prepolymers having an isocyanate content of 0.5% to 40% by weight.

U.S. Pat. No. 5,523,344 (Maksymkiw et al.) discloses water-based adhesive formulations having enhanced characteristics. As disclosed in the reference, a surprising feature of the preferred embodiments of the invention is that the polyisocyanate crosslinking agent can be added to the adhesive at least a month before use without destabilizing (gelling or high sedimentation) the system and therefore, the crosslinked compositions can be prepared by the supplier before shipping to the end user.

German Utility Model Pat. No. 9304018 discloses an adhesive comprising at least a two component polyurethane dispersion having a pot life of 12 hours or greater. This water-based formulation describes a polymer blend of polyurethane dispersions, EVAs, water dispersible polyfunctional isocyanates and one essentially non-hydrophobic plasticizer.

The references described above disclose two-component aqueous polyurethane dispersions in which a water dispersible polyisocyanate or isocyanate-terminated urethane prepolymer is a crosslinker, and an aqueous polyurethane dispersion is added at, or shortly before, the time it is applied to a substrate and dried. The two-component aqueous polyurethane dispersions have a short pot life (have high settlements or gelled in several hours). The present inventors have found a stable one-component aqueous polyurethane dispersion (have no settlements and have no substantial viscosity change for about six to about twelve months) comprising a reaction product of at least one water dispersible isocyanate-terminated polyurethane prepolymer, at least one aqueous polyurethane dispersion and water.

SUMMARY OF THE INVENTION

The present invention discloses stable one-component aqueous polyurethane dispersions comprising the reaction product of:
 a) at least one water dispersible isocyanate-terminated polyurethane prepolymer (A) comprising the reaction product of:
  i) at least one polyisocyanate;
  ii) at least one hydroxy carboxylic acid;
  iii) at least one polymeric polyol; and
  iv) optionally, at least one sulfonated polyol;
 b) at least one aqueous polyurethane dispersion (B) comprising active hydrogen atoms selected from the group consisting of primary hydroxyl groups, secondary hydroxyl groups, primary amines, secondary amines and mixtures thereof; and
 c) water;
wherein said reaction product is in the form of at least one of the structures including a grafted polymer, an interpenetrating network (IPN), a core/shell structure and mixtures thereof.

The aqueous polyurethane dispersion (B) is the reaction product of: (i) at least one isocyanate terminated polyurethane prepolymer (B); (ii) at least one amine chain extender; (iii) alcoholamine chain terminator; and (iv) optionally, water. The polyurethane prepolymer (B) (i) is based on at least one different polyisocyanate, or at least one different polymeric polyol, or based on a different ratio of polyisocyanate/polyol as compared with those of polyurethane prepolymer (A).

Usually, the content of an isocyanate-terminated urethane prepolymer as a crosslinker is less than 20% by weight based on total solids in the prior art two-component system. The stable one-component aqueous polyurethane dispersion of the present invention comprises about 20% by weight to about 95% by weight, preferably about 50% by weight to about 90% by weight of water dispersible isocyanate-terminated polyurethane prepolymer based on the total solids. In the prior art, the temperature of the two-component aqueous polyurethane dispersion after adding the crosslinker (NCO-terminated polyurethane prepolymer) should be kept at a low temperature (usually room temperature) in order to obtain longer pot life. In preparing the stable one-component aqueous polyurethane dispersion of the present invention, the reaction temperature of the at least one isocyanate terminated polyurethane prepolymer (A), at least one aqueous polyurethane dispersion (B) and water should be kept at a high temperature, e.g., about 35° C. to about 95° C., preferably about 50° C. to about 80° C. to produce a dispersion which is substantially free of isocyanate and conducted for a short period of time of about 1 to 2 hours.

In another aspect, the present invention discloses a method for the preparation of stable aqueous polyurethane dispersions comprising the steps of:
 1) providing at least one water dispersible isocyanate-terminated polyurethane prepolymer (A) comprising the reaction product of:

i) at least one polyisocyanate;
ii) at least one hydroxy carboxylic acid;
iii) at least one polymeric polyol; and
iv) optionally, at least one sulfonated polyol;
2) providing at least one water-based polyurethane dispersion (B) comprising active hydrogen atoms;
3) dispersing 1) in 2) and water under vigorous agitation to form a polyurethane dispersion mixture; then
4) allowing said dispersion mixture to react at a temperature in a range of from about 35° C. to about 95° C. until substantially free of isocyanate.

Surprisingly, the method described above forms aqueous polyurethane dispersions having enhanced stability and a dissimilar particle size distribution as compared to a simple blend of the non-reactive polyurethane dispersion or blends of two-component aqueous polyurethane dispersions. Additionally, the dried polymers therefrom have increased hot-tack adhesion characteristics.

The inventive compositions are useful as adhesives on substrates including paper, metal, glass, concrete, cloth and synthetic polymers, and are useful in applications including fiber glass sizing, woodworking, automotive membrane pressing, dry-bond film laminating, and in the manufacture of footwear.

In another aspect, the invention discloses stable aqueous polyurethane-based hybrids comprising:
a) at least one one-component stable aqueous polyurethane dispersion as described above; and
b) at least one water-based polymer selected from the group consisting of acrylic polymer dispersions, vinyl polymer dispersions, vinyl-acetate-ethylene copolymer dispersions, polychloroprene dispersions, styrene emulsions, starch, dextrins, caseins, animal pectins, acid rosin esters and mixtures thereof;
wherein the stable aqueous polyurethane dispersion is used as a seed for the polymerization of the water based polymer.

BRIEF DESCRIPTION OF THE DRAWINGS

Figure A is a graph showing the number average particle size distribution of the stable aqueous polyurethane dispersions of the present invention (solid line) compared to a simple blend of the non-reactive polymer dispersions (dotted line) prepared in Example 7. It shows that the inventive stable aqueous polyurethane dispersion is more homogeneous (single peak for the number average particle size distribution) than a simple blend of two-component aqueous polyurethane dispersions (double peak for the number average particle size distribution).

Figure B is a graph showing the weight average particle size distribution of the stable aqueous polyurethane dispersions of the present invention (solid line) compared to the simple blend of the non-reactive polymer dispersions (dotted line) prepared in Example 7. It shows that the weight average particle size of the inventive stable aqueous polyurethane dispersion becomes bigger compared with that of the simple blend of the two-component aqueous polyurethane dispersions.

Both Figure A and Figure B indicate that the inventive stable one-component aqueous polyurethane dispersion comprises a polyurethane (A)/polyurethane (B) grafted polymer, a core-shell structure, or an interpenetrating polymer network (IPN).

DETAILED DESCRIPTION OF THE INVENTION

The stable one-component aqueous polyurethane dispersions of the present invention have enhanced stablility, a dissimilar particle size distribution and increased hot tack characteristics as compared to a simple blend of the non-reactive two-component aqueous polyurethane dispersions. The inventive dispersions are formed using a method wherein isocyanate-terminated polyurethane prepolymers are reacted with at least one dissimilar aqueous polyurethane dispersion and water. The dissimilar aqueous polyurethane dispersion preferably contains active hydrogen atoms such as primary amines, secondary amines, primary hydroxyl groups and secondary hydroxyl groups. The prepolymer interacts with the dissimilar polyurethane dispersion to form a structure selected from the group including grafted polymer, interpenetrating polymer networks (IPN), a core-shell structure and mixture thereof. The frequency of such interactions can be influenced by the quantity of isocyanate, active hydrogen atoms present in the respective aqueous polyurethane dispersions and the reaction temperature. Such an interaction can provide polyurethane dispersions having enhanced stability and can improve the performance of the stable aqueous polyurethane dispersion.

The following glossary is provided as an aid to understand the use of certain terms herein. The explanations provided in the glossary are for illustrative purposes and do not limit the scope of the invention.

The term "interpenetrating polymer network" (IPN) is defined as a crosslinked and/or semi crosslinked system comprising at least two dissimilar or different polymers. IPNs are further described in the "Handbook of Adhesives", Irving Skeist, Third edition, chapter 1, page 18, Van Nostrand, N.Y., 1990.

The term "polyurethane" is defined as a polymer containing two or more urethane groups and is intended to include polyurethane polymers containing urea groups as well (e.g., polyurethane-urea polymers).

The term "dissimilar particle size distribution" is defined as different particle size distribution.

The term "hybrid" is defined as a polymer comprising two or more dissimilar polymers wherein the dissimilar polymers may or may not be covalently linked.

The term "stable aqueous polyurethane dispersion" is defined as a dispersion which is substantially resistant to viscosity change, coagulation, and sedimentation after about a 6-month period when contained in a closed vessel and stored at a temperature in a range of from about 20° C. to about 35° C.

For the purpose of this invention, "substantially free of isocyanate" refers to a stable aqueous polyurethane dispersion containing at least less than 0.1% isocyanate.

The term "dispersion" as described herein is defined as a polymer suspended in an aqueous medium and is also intended to cover solutions.

The term "vinyl polymer" is defined as a polymer containing one or more ethylenically-unsaturated monomer units.

The phrase "seed emulsion polymerization" refers to polymerization in which the preformed polymer species act as a "seed" for further polymerization. The seeds may activate the monomer or polymer active centers may have been preformed by the addition of a small amount of a monomer to the initiator. In emulsion polymerization, the preformed latex may be used as a seed for further polymerization by growth of the particles.

By "core-shell" is understood to mean that when parts of the isocyanate groups of the prepolymer (A) reacts with functional groups of the aqueous polyurethane dispersion (B), the [polyurethane (A) polyurethane (B)] grafted polymer is formed. The reaction is allowed to proceed and continued until the dispersion is substantially free of isocyanate to form the polyurethane (B) core/polyurethane (A) shell structure.

The core shell polymers are prepared by dispersing the polyurethane prepolymer (shell) in a polyurethane dispersion containing functional groups (core). The weight ratio of the core to the shell is about 5 to about 80: about 20 to about 95, preferably about 10 to about 50: about 50 to about 90. The core polymer has an average molecular weight of about 1,000 to about 500,000, and the shell having a weight average molecular weight of greater than about 5,000 to about 500,000.

The stable aqueous polyurethane dispersion of the present invention is prepared by dispersing an isocyanate terminated polyurethane prepolymer (A) in an aqueous polyurethane dispersion (B) at about 35° C. to about 95° C. until substantially free of isocyanate. In some instances, prepolymer (A) does not form a stable dispersion when dispersed in water by itself. In the present invention, aqueous polyurethane dispersion (B) stabilizes the prepolymer (A) dispersion. A part of the isocyanate groups of prepolymer (A) is surmised to have reacted with functional groups such as amine or hydroxy groups of the aqueous polyurethane dispersion (B) to form the polyurethane (A)/polyurethane (B) grafted polymer. At the same time, another part of the isocyanate group of prepolymer (A) is surmised to have reacted with water to form an amino group which is immediately reacted with an isocyanate group of the prepolymer and self chain extension to produce an IPN and a core [polyurethane (B)]-shell [polyurethane (A)] structure. Thus, the final dispersion can comprise a structure selected from the group consisting of a grafted polymer, an IPN, a core-shell structure and mixtures thereof. This is demonstrated by the particle size distribution of the above reacted mixtures where the particle size distribution shows a shift to large particles after the reaction of components (A) and (B).

By utilizing functional groups capable of chemical grafting, the core and shell components are grafted together to form the core-shell polymer structure. The core-shell polymers have the polymer core and the shell polymer wherein the core and the shell are chemically grafted to a significant or substantial extent that the core and shell are permanently attached. It is the permanent attachment of the shell and the core through chemical grafting that is believed to give the core-shell polymers of the present invention their improved stability. This is unlike the prior art composition, when the polyurethane prepolymer is added as a crosslinker, at room temperature, to the aqueous polyurethane dispersion prior to use to improve adhesion properties. The prior art systems thus formed are not stable as compared to the inventive one-component dispersion. In contrast, the present invention is a stable one-component system, having improved properties. They are mixed at an elevated temperature of about 35° C. to about 95° C.

The diisocyanate used to form the stable one-component aqueous polyurethane dispersions of the present invention can be aliphatic or aromatic diisocyanates and mixtures thereof. Examples of suitable aliphatic diisocyanates are isophorone diisocyanate (IPDI), cyclopentylenediisocyanate, cyclohexylenediisocyanate, methylcyclohexylenediisocyanate, dicyclohexylmethanediisocyanate (H12 MDI), hexamethylenediisocyanate (HDI), and tetramethylxyyenediisocyanate (TMXDI). Examples of suitable aromatic diisocyanates are phenylenediisocyanate, toluenediisocyanate (TDI), xylylenediisocyanate, biphenylenediisocyanate, naphthylenediisocyanate and diphenylmethanediisocyanate (MDI). The preferred isocyanates are aliphatic diisocyanates. The most preferred diisocyanates are mixtures of HDI with IPDI or TMXDI. If a mixture of diisocyanate is used, the mixture can contain a ratio in a range of from about 95:5 to about 5:95, more preferably from about 75:5 to about 25:75 based on total diisocyanate mixture.

If desired, small quantities of monoisocyanates and polyisocyanates may be used to form the prepolymers of the present invention. The monoisocyanates and polyisocyanates are used in such proportions that the resulting prepolymer has an average isocyanate content of at least about two or more than two. Examples of suitable monoisocyanates and polyisocyanates include methyl isocyanate, ethyl isocyanate, octadecyl isocyanate and the modified diisocyanates having an isocyanate content greater than two such as the trimers of hexamethylene diisocyanate, isophorone diisocyanate and toluene diisocyanate. Additionally, the modified polyisocyanates may have functionalities including urethanes, uretdiones, biurets, isocyanurates and mixtures of functionalities.

At least one dihydroxyl alkanoic acid is used in the preparation of the water dispersible isocyanate-terminated polyurethane prepolymer described in the present invention. Suitable examples include 2,2-dimethylolethanoic acid, 2,2-dimethylolpropanoic acid, 2,2-dimethylolbutanoic acid and 2,2-dimethylolpentanoic acid. Additional examples of dihydroxy alkanoic acids are further described in U.S. Pat. No. 5,608,000 (Duan et al.) incorporated herein by reference. The dihydroxy alkanoic acid can be present in a range of from about 0.1% by weight to about 5% by weight, and preferably from about 2% by weight to about 4% by weight based on total solids. Further, the dihydroxy carboxylic acid within the prepolymer can be converted to other ionic groups, e.g., salts, before or after the isocyanate-terminated polyurethane prepolymer has been dispersed into water. These other ionic groups can be formed with a base including alkali metal salts such as sodium hydroxide, tertiary amine such as triethylamine and ammonia hydroxide. Alternatively, the prepolymer can be converted into ionic groups before or after being dispersed directly into an aqueous polyurethane dispersion.

At least one polymeric polyol is used in the preparation of the isocyanate-terminated polyurethane prepolymers of the present invention. Suitable examples include polyester polyols, polyether polyols, polyesterether polyols, polycarbonate polyols, polyurethane-based polyols, polyacetal polyols, polyacrylic polyols, polycaprolactone polyols, polythioether polyols and the anionic polyols described in U.S. Pat. No. 5,610,232 (Duan et al.) incorporated herein by reference.

If desired, a sulfonated polyester polyol may be used in the preparation of the water dispersible isocyanate-terminated prepolymer and said polyol can have hydroxyl numbers, as determined by ASTM designation E-222-67 (method B), in a range of from about 20 to about 140, and preferably from about 40 to about 110. The polyols may be formed with components such as diacids, sulfonate diols and sulfonate diacids. The sulfonated polyols may be any polyester polyol which incorporates sulfonate groups via sulfonate functional dicarboxylic acid residues and/or sulfonate functional diol residues. Such polyols are further described in U.S. Pat. No. 5,608,000 (Duan et al.), incorporated herein by reference. The preferred sulfonated polyester polyols are based on 5-sulfoisophthalic acid monosodium salt, adipic acid and 1,6-hexanediol and/or diethylene glycol. It is surmised that the sulfonate character, present in the polymeric polyol segment, enhances the aqueous polyurethane dispersion's stability.

If desired, monoalcohols and higher functional polyols having more than two hydroxyl groups per molecule may be used in the preparation of the isocyanate-terminated polyurethane prepolymer. The monoalcohols and polyols are used in such proportions that the resulting prepolymer has an average isocyanate content of about two or more than two. Suitable examples include methanol, ethanol, n-propanol, isopropyl alcohol, hexanol, octanol, glycerol, trimethylolpropane, 1,2,4-butanetriol, 1,2,6-hexanetriol and mixtures thereof. The monoalcohols and/or higher functional polyols can be present in the prepolymer forming reaction in a range of from about 0.1% by weight to about 5% by weight, and preferably from about 0.5% by weight to about 2% by weight based on total weight of the prepolymer. The monoalcohols are used to lower the average molecular weight distribution of the finished dispersion while the higher functional polyols are used to provide branching within the polymer network.

The isocyanate-terminated polyurethane prepolymer is prepared by reacting a stoichiometric excess of diisocyanate with compounds containing active hydrogen atoms. The reactants are in such proportions that the resulting percent isocyanate can be in a range of from about 1% by weight to about 10% by weight, and preferably from about 2% by weight to about 5% by weight based on the total weight of the prepolymer. The prepolymers can be formed at a temperature in a range of from about 25° C. to about 120° C., and preferably from about 65° C. to about 100° C. At temperatures of less than 25° C., the prepolymer's viscosity is increased, making it more difficult to process. For example, increased prepolymer viscosity can quickly wear down mechanical parts within the equipment, such as gears and pumps. Additionally, viscous prepolymers often require increased mechanical agitation over extended periods of time to adequately provide uniform dispersions. It is possible to use co-solvents to help reduce prepolymer viscosity but such additives are less desirable in that environmental laws and health and safety issues often limit their use. Alternatively, a temperature greater than 120° C. can be undesirable to the prepolymers' physical characteristics in that elevated temperatures can cause isocyanate side reactions and/or pyrolysis.

If desired, small quantities of catalysts may be used to accelerate the prepolymer reaction. The catalysts can be present in a range of from about 0.05% by weight to about 2.0% by weight, and preferably from about 0.13% by weight to about 0.15% by weight based on total prepolymer solids. A preferred catalyst includes Metacure™ T-12 which is an organic tin compound from Air Products and Chemicals, Inc., (Allentown, Pa.).

If desired, the prepolymer may be prepared in the presence of co-solvents provided that the solvent is free of active hydrogen atoms. The addition of co-solvent may be desirable to lower prepolymer viscosity and aid in dispersing, especially those co-solvents such as acetone and n-methylpyrollidinone which are water soluble. Examples of additional co-solvents that may be employed are ketones, esters, ethers and ketoesters. The co-solvent may be present in the prepolymer in a range of from 0% by weight to about 30% by weight, preferably from about 1% by weight to about 5% by weight.

If desired, external emulsifying agents which are free of active hydrogen atoms can be used to enhance the isocyanate-terminated polyurethane prepolymer water dispersibility or film forming characteristics. For example, external dispersing agents such as cationic surfactants, anionic surfactants and nonionic surfactants can be used to enhance the prepolymers' dispersibility in water. The surfactant may be added to the prepolymer prior to dispersing in water or, alternatively, the surfactant may be added to the water before or after the prepolymer has been dispersed. Additionally, surfactants can be used to enhance the final dispersions' film forming characteristics. For example, to enhance the dispersions' wet-out characteristics on low energy substrates, it may be necessary to lower the dispersions' aqueous surface tension with surface active agents such as the surfactants described above. The surfactants may be present in the dispersion up to about 5% by weight and preferably from about 1% by weight to about 0.001% by weight, based on the total weight of the final dispersion. A surfactant level less than 1% by weight is often preferred in that higher surfactant levels sometimes can adversely affect the dried polymers' water resistance characteristics.

Once the isocyanate-terminated polyurethane prepolymer has been formed, it may be dispersed in a dissimilar aqueous polyurethane dispersion and a distilled/deionized water using agitation. The quantity of water used in the preparation of the stable one-component aqueous polyurethane dispersions or solutions is from about 70% by weight to about 50% by weight, preferably from about 65% by weight to about 60% by weight based on total weight of the dispersion or solution. The prepolymer can be dispersed by adding the prepolymer incrementally to the aqueous polyurethane dispersion or the mixture of the aqueous polyurethane dispersion and water or by adding the aqueous polyurethane dispersion or the mixture of the aqueous polyurethane dispersion and water incrementally to the prepolymer. The temperature of the water and the aqueous polyurethane dispersion before dispersing can be in a range of from about 35° C. to about 95° C., and preferably from about 45° C. to about 85° C.

The isocyanate-terminated polyurethane prepolymers of the present invention may have an isocyanate content in a range of from about 1% by weight to about 15% by weight, preferably from about 2% by weight to about 8% by weight, and most preferably from about 3% by weight to about 5% by weight based on total solids. An isocyanate content of less than about 1% by weight may be undesirable in that these prepolymers often require additional co-solvent to help lower the prepolymer viscosity. Alternatively, an isocyanate content greater than 15% by weight can be undesirable in that the dispersion stability may be compromised. For example, excess isocyanate can react with water to form carbon dioxide which then equilibrates with water to form a weak acid, i.e., carbonic acid. This weak acid can destabilize anionic polyurethane dispersions by neutralizing counter cations making the polymer less stable in water. It may be possible to incorporate carbon dioxide-binding agents into the dispersion such as those described in U.S. Pat. No. 4,857,368 (Klein) incorporated herein by reference. Additionally, the isocyanate-terminated polyurethane prepolymers of the invention have an isocyanate equivalence from about 1.5 to about 2.5 and preferably from about 1.75 to about 2. An isocyanate equivalence greater than 2.5 may be undesirable to the dispersions pot stability in that such isocyanates often destabilize the dispersion as the crosslink density of the polymer increases.

The isocyanate-terminated polyurethane prepolymer and aqueous polyurethane dispersion are preferably combined and heated to a temperature in a range from about 35° C. to about 95° C., and preferably from about 50° C. to about 80° C. until the dispersion mixture is substantially free of isocyanate. The prepolymer or prepolymer dispersion may be added to the aqueous polyurethane dispersion using a weight ratio of from about 20:80 to about 95:5, and preferably from about 50:50 to about 90:10 based on total solids. Alternatively, the aqueous polyurethane dispersion may be added to the prepolymer or prepolymer dispersion using the ratios described above. In contrast, the prior art composition, the polyurethane prepolymer, as a crosslinker, is added to the aqueous polyurethane dispersion using a weight ratio of less than 20:80 based on total solids, otherwise, the system will have a very short pot life or even immediately will be gelled.

The stable one-component aqueous polyurethane dispersions of the present invention have a dissimilar particle size distribution as compared to a simple blend of non-reactive two-component aqueous polyurethane dispersions. It is surmised that the isocyanate-terminated polyurethane prepolymers can react with active hydrogens present on the dissimilar aqueous polyurethane dispersion to provide a dispersed particle having an increased weight average particle size distribution. It is further surmised that such an interaction can enhance the dispersions stability in that the aqueous polyurethane dispersion can act as a surfactant agent. The inventive dispersions can have a monomodal or bimodal particle size distribution and the average particle size distribution can be in a range of from about 30 nanometers to about 500 nanometers, and preferably from about 40 nanometers to about 250 nanometers. An average particle size distribution greater than about 500 nanometers is undesirable to the dispersions stability and/or film forming characteristics. For example, anionic polyurethane dispersions having an average particle size distribution greater than about 500 nanometers often settle over time. Increased sedimentation can be detrimental in laminating adhesive applications in that such materials may produce irregular coat weights, and thus bonded articles can have decreased optical clarity.

The dispersions can have a solids content in a range of from about 20% by weight to about 60% by weight, and preferably from about 35% by weight to about 50% by weight. A solids content outside the preferred range may be undesirable for certain applications. For example, an aqueous polymer dispersion having a lower solids content often requires extended dry times. Alternatively, a higher solid content often forms dispersions having increased viscosities making them more difficult to process.

The aqueous polyurethane dispersions described in the present invention are preferably anionic and can have a pH in a range of from about 6 to about 10, and preferably, from about 7 to about 9. The anionic groups present in the prepolymer are made ionic using counter cations such as alkali metal hydroxides, tertiary amines and ammonia. Preferred counter cations are formed from sodium hydroxide, potassium hydroxide and triethylamine. In the preparation of aqueous polymer adhesives having reduced volatile organic chemicals (VOC) and/or leachable contaminants, the use of alkali metal salt are most preferred, because volatile counter cations such as triethylamine often increases the dispersions' VOC, while alkali metal salts are considered non-volatile and the strong ionic attraction reduces the possibility of leachable contaminants.

The inventive dispersions can have viscosities in a range of from about 30 mPas to about 10,000 mPas, and preferably from about 50 mPas to about 500 mPas. In many adhesive applications, lower viscosities are often preferred in that it allows the end user to selectively increase the viscosity, if desired, with effective amounts of thickening agents. Alternatively, aqueous polymer adhesives having a higher viscosity (i.e., greater than about 10,000 mPas) can be undesirable in some applications where low viscosity is required for enhanced processing. However, if a lower viscosity is required, an end user often reduces the viscosity using additional solvent, though this may be undesirable in that higher levels of solvent can extend the dry times and often slows down the production process. Special drying equipment such as heaters may be used to accelerate the evaporation of the excess solvent but this accommodation often increases the complexity and cost of the operation.

To further enhance the properties of the dispersions described in the present invention such as adhesion, solvent resistance and heat resistance, it may be desirable to formulate the stable aqueous polyurethane dispersions with dissimilar polymer dispersions to form aqueous polyurethane-based hybrids. Suitable water based polymer examples include water-based polyacrylics, water-based polyvinyl-acrylics, water-based polystyrene-acrylics, water-based polyvinyl acetate, water-based polyvinyl-acetate-ethylene terpolymers and their mixtures. The formulations can have a weight ratio of aqueous polyurethane dispersion to other dissimilar polymer in a range of from about 9:1 to about 1:9, and preferably from about 7.5:2.5 to about 2.5:7.5 based on total weight. The stable aqueous polyurethane-based hybrids described above are formed using a method wherein the stable aqueous polyurethane dispersions of the present invention are blended with the dissimilar polymer dispersions. Alternatively, the inventive dispersions may be synthesized in the presence of ethylenically unsaturated monomers to generate polymer blends and/or polymer hybrids. The inventive dispersion is used as a seed for the polymerization of the water based polymer. Such processes are further described in U.S. Pat. No. 4,644,030 (Loewrigkeit et al.), U.S. Pat. No. 3,624,020 (Klebert et al.), U.S. Pat. No. 3,684,758 (Honig et al.), U.S. Pat. No. 3,862,074 (Hickey), U.S. Pat. No. 4,888,383 (Huybrechts), U.S. Pat. No. 5,095,069 (Ambrose et al.), U.S. Pat. No. 5,137,961 (Goos et al.) and U.S. Pat. No. 5,371,133 (Stanley), all of which are incorporated herein by reference.

If desired, water dispersible polyfunctional crosslinking agents can be formulated with the stable aqueous polyurethane dispersions described in the present invention. Such additives have been known to enhance polymer properties including adhesion, solvent resistance and heat resistance. Suitable crosslinking agents can be selected from polyisocyanates, polyoxazolines, polycarbodiimides, polyaziridines, polyepoxies, polyurethane prepolymers and their mixtures. The crosslinking agents can be present in the formulations in a range of from about 1% by weight to about 20% by weight, and preferably from about 3% by weight to about 7% by weight based on the total weight of the formulation. The crosslinking agents which have an average equivalence greater than two, i.e., polyisocyanate, increase the adhesive crosslink density to provide polymers having enhanced heat resistant characteristic.

The inventive dispersions may be used as an adhesive, binder, sizer, coating or primer and can be applied to any substrate including paper, wood, leather, metal, ceramics, cloth, natural rubber and synthetic polymers such as plastic. Additionally, the dispersions may be applied onto a substrate using application methods known in the art including brushing, spraying and roll coating.

The characteristics of the present dispersion may be further modified by the addition of materials including defoaming agents, coalescing aids, fungicides, bactericides, plasticizers, thickening agents, fillers, reactive pigments, UV stabilizers, perfume-like materials, sequestering agents, organic co-solvents including acetone and n-methylpyrrolidinone, water dispersible waxes, oils, fire retardant agents and their mixtures. Such materials may be introduced at any stage of the production process. For example, the materials may be present in the water dispersible isocyanate-terminated polyurethane prepolymer prior to dispersing in water or the aqueous polyurethane dispersion. Alternatively, such materials may be present in the dispersion water or the aqueous polyurethane dispersions prior to the dispersing process.

Test Methods

The following test methods were used to characterize the polymers of the present invention:

Peel Strength

This test method was used to determine the adhesives' peel strength values at ambient room temperatures. A precut sheet (26.67 cm.×32.38 cm.) of 10 mil thick clear, pressed, polished polyvinyl chloride (PVC) was cleaned with isopropyl alcohol and placed on a glass plate. The aqueous adhesive was applied onto the film using a applicator set at 5 mils according to ASTM D323-87. The coated PVC was dried at ambient room temperatures and a second sheet of uncoated PVC was placed thereon. The sheet was cut into a 2.54 cm.×15.24 cm. strip making sure that a 13.81 cm. section at each end of the test specimen was free of adhesive. The specimen was then heat sealed, with the uncoated PVC in contact with the heated upper platen, using a platen temperature of about 71° C. for 30 seconds at 3.5 kgs./cu.cm. The bonded specimen was then aged at ambient room temperatures for 1 to 2 hours. Peel strength values were evaluated on a Thwing Albert Intellect 500 using a crosshead speed of 30.48 cm. per minute.

Peel Adhesion Failure Temperature

This test method was used to determine the adhesives' bond strength when subjected to increased thermal and mechanical stress. The test specimens were prepared in the following manner. Approximately 1.5 grams of the water-based adhesive was coated onto a 2.5 cm. by 2.5 cm. area located on the end of a 2.5 cm. by 10.5 cm. strip of polyvinyl chloride (PVC). The coated specimen was then dried at ambient room temperature and matted with a second piece of PVC, using a T-peel configuration, and pressed together using a Sentinal Heat Sealer Model 808/1 (Sencorp Systems, Inc., Mass.) at 71° C. for 30 seconds using a 3.5 kgs./cu.cm. nip pressure. The test specimens were then attached to a static 0.1 kg. load and placed in a Tenny oven and subjected to a 25° C. increase in temperature each hour until bond failure or to a maximum temperature of 125° C. Failure temperatures were automatically recorded by a sensing unit which records the temperature at which the bond fails.

Hot-Tack Method

Hot tack may be defined as the bonding strength between two substrates at the point immediately after their having been joined together by application of heat. The hot tack method evaluates the adhesives' cohesive strength immediately after heat activation. The method is specific to footwear applications bonding shoe soling to upper materials. A 2.54 cm.×15.84 cm. substrate is brush coated with 5 mils of the aqueous adhesive and dried for 1 hour at 23° C. and 50% relative humidity. The dried-coated substrate is then heat activated at 70° C. using an Electrotecnica IR flash reactivation unit (model 133) and mated with a second substrate then manually pressed using a 200 gram roller. The adhesively bonded sample was then tested on a slip/peeler model 3M90 (Instrumentors Inc.) for 180 degree peel values at 30.48 cm./minute. The time between heat activation and peel is less than 15 seconds.

Particle Size Distribution

The particle size and size distribution of the dispersions were analyzed by Capillary Hydrodynamic Fractionation using a CHDF-1100 particle sizer from Matec Applied Sciences (Hopkinton, Mass.).

All of the cited patents and publications are incorporated herein by reference. The following specific examples are provided to better assist the reader in the various aspects of practicing the present invention. As these specific examples are merely illustrative, nothing in the following descriptions should be construed as limiting the invention in any way.

EXAMPLES

The present invention is further illustrated by the following non-limiting examples.

Example 1

Example 1 describes the preparation of a water dispersible isocyanate-terminated stable aqueous polyurethane used to make the stable polyurethane dispersions of the present invention:

213.8 grams of Rucoflex™ XS-5483-55, which is a sulfonated polyester polyol from Ruco Corp (Hicksville, N.Y.), 10.5 grams of dimethylolpropionic acid and 6.75 grams of 1,4-butanediol, were combined and heated to approximately 65° C. The polyol mixture was charged with 25.9 grams of isophorone diisocyanate, 39.2 grams of hexamethylene diisocyanate and 19.1 grams of acetone. The materials were agitated and heated to 70° C. for 2.5 hours.

Example 2

Example 2 describes the preparation of a stable aqueous polyurethane dispersion of the present invention:

The prepolymer described in Example 1 was charged with 7.8 grams of triethylamine and 759.3 grams of Dispercoll U-53 which is a sulfonated polyurethane dispersion from Bayer Corp. The polyurethane dispersion was diluted with 455.6 grams of water and heated to 70° C. prior to addition to the prepolymer. The dispersion was agitated and heated to 65° C. for 2 hours. The resulting dispersion had a solid content of 39.8%, a pH of 7.5, a viscosity of 350 mPas, a Peel Strength of 14.2 kg. per inch, and a PAFT of 118° C.

Example 3

Example 3 describes the preparation of a stable aqueous polyurethane dispersion of the present invention:

The prepolymer described in Example 1 was charged with 7.8 grams of triethylamine and 607 grams of Dispercoll™ U-42 which is a sulfonated polyurethane dispersion from Bayer Corp. The polyurethane dispersion was diluted with 357 grams of water and heated to 70° C. prior to addition to the prepolymer. The dispersion was agitated and heated to 65° C. for 2 hours. The resulting dispersion had a solid content of 40.1%, a pH of 7.8, a viscosity of 5000 mPas, a peel strength of 8.5 kg. per inch, and a PAFT of 108° C.

Example 3-A

Example 3-A describes the preparation of an aqueous polyurethane dispersion which is part of the present invention:

119.1 grams of Rucoflex™ XS-5483-55, 106.9 grams Rucoflex™ XS-5570-55, which is a sulfonated polyether-ester polyol from Ruco Corp. (Hicksville, N.Y.), 10.05 grams of dimethylolpropionic acid and 6.75 grams of 1,4-butanediol were combined and heated to approximately 65° C. 72.2 grams of norbornane diisocyanate and 18.5 grams of acetone were added and the material mixture was agitated and heated to 70° C. for 2.5 hours. 8.0 grams of triethylamine was added and allowed to react for 10 minutes to form a water dispersible NCO-terminated polyurethane-norbornane prepolymer. The prepolymer was then dispersed in 581.4 grams of deionized water and stirred another 2 hours at 65° C. The aqueous polyurethane-norbornane dispersion had a peel strength of 6.3 kgs. per 2.54 cm. and a PAFT greater than 88° C.

Example 3-B describes the preparation of an aqueous polyurethane dispersion which is not part of the present invention:

119.1 grams of Rucoflex™ XS-5483-55, 106.9 grams Rucoflex™ XS-5570-55, 10.05 grams of dimethylolpropionic acid and 6.75 grams of 1,4-butanediol were combined and heated to approximately 65° C. 25.9 grams of isophorone diisocyanate, 39.2 grams hexamethylene diisocyanate and 18.05 grams of acetone were added and the mixture was agitated and heated to 70° C. for 2.5 hours. 8.0 grams of triethylamine was added and allowed to react for 10 minutes to form a water dispersible NCO-terminated polyurethane-norbornane prepolymer. The prepolymer was then dispersed in 568.6 grams of deionized water and stirred at 60° C. for 2 hours. The aqueous polyurethane dispersion had a peel strength of 6.1 kgs. per 2.54 cm. and a PAFT greater than 60° C.

The data indicates that Example 3-A has increased PAFT compared to Example 3-B, thus showing the utility of the invention.

Example 4

Example 4 describes the preparation of a stable aqueous polyurethane dispersion using more than one polyurethane dispersion:

The prepolymer described in Example 1 was charged with 7.8 grams of triethylamine and charged with 380 grams of Dispercoll™ U-53 and 304 grams Dispercoll™ U-42. The polyurethane dispersions were combined and diluted with 532 grams of water and heated to 70° C. prior to addition to the prepolymer. The dispersion was agitated and heated to 65° C. for 2 hours. The resulting dispersion had a solid content of 40.2%, a pH of 7.5, a viscosity of 350 mPas, a destruct bond peel strength, and a PAFT of greater than 125° C.

Example 4-A

Example 4-A describes the aqueous polyurethane dispersion which is used to form the hybrid:

213.8 grams of Rucoflex™ XS-5483-55, 10.5 grams of dimethylolpropionic acid and 6.75 grams of 1,4-butanediol were combined and heated to approximately 65° C. 72.2 grams of norbornane diisocyanate and 17.8 grams of acetone were added and the material mixture was agitated and heated to 70° C. for 2.5 hours. 8.0 grams of triethylamine was added and allowed to react for 10 minutes to form a water dispersible NCO-terminated polyurethane-norbornane prepolymer. The prepolymer was then dispersed in 559.4 grams of deionized water and heated an additional 2 hours at 60° C. The aqueous polyurethane-norbornane dispersion had a peel strength of 9.2 kgs. per 2.54 cm. and a PAFT greater than 125° C.

Example 5

Example 5 describes the preparation of a stable aqueous polyurethane-acrylic hybrid using the aqueous polyurethane dispersion of Example 4:

72.7 grams of deionized water and 7.3 grams of T-Det™, which is a surfactant from Hacros, were charged into a vessel and mixed for 10 minutes. A mixture of materials consisting of 128 grams of methyl methacrylate, 131 grams of n-butyl acrylate and 5 grams of hydroxyl ethylacrylate were then charged into the reactor over a 25 minute period, using agitation, to form a pre-emulsion. In a separate vessel, equipped with an agitator, a thermometer, a condenser and a nitrogen inlet, was charged 160 grams of deionized water, 0.05 grams of thiolactic acid, 0.1 grams of hydrosulfite, 0.03 grams of Hamp-OL 4.5% iron from Hampshire and 219 grams of the dispersion described in Example 4. The pre-emulsion was fed into the reactor over a 4 hour period keeping the temperature at 65° C. Simultaneously, a mixture containing 1.6 grams of t-butyl hydrogen peroxide, 15.6 grams of deionized water and a mixture containing 0.73 grams of hydrosulfite and 15.6 grams of deionized water were added to the reactor over a 4.5 hour period. After the feeds were complete, the reactor contents were heated an additional hour at 65° C. The dispersion was cooled to ambient room temperature and filtered through 200 mesh filter. The dispersion had a solid content of 47%, a pH of 7.25 and a viscosity of 316 mPas.

Example 6

Example 6-A describes the hot-tack characteristics of an adhesive of the present invention as compared to the simple blend of non-reactive polymers.

The prepolymer described in Example 1 was charged with 7.8 grams of triethylamine then dispersed in 523 grams water. The prepolymer dispersion was immediately blended with 564 grams of Dispercoll™ U-53 and heated an additional 2 hours at 60° C. The resulting dispersion had a hot-tack of 964 grams per cm.

Example 6-B (Comparative)

The prepolymer described in Example 1 was charged with 7.8 grams of triethylamine then dispersed in 523 grams water and heated to 60° C. for 2 hours to form a water-based polyurethane-urea free of isocyanates. The water-based polyurethane-urea polymer was dispersed in 564 grams of Dispercoll™ U-53. The resulting dispersion had a hot-tack of 428 grams per cm.

The data shows that the inventive polymer (Example 6-A) has increased hot-tack compared to the comparative (Example 6-B) showing the utility of the invention.

Example 7

Example 7 describes the number and weight average particle size distribution of several stable aqueous polyurethane dispersions of the present invention as compared to the simple blend of the non-reactive polymer dispersions.

Example 7-1 describes the preparation of an aqueous sulfonated polyurethane dispersion (PUDa).

442.2 grams of Rucoflex™ XS-5483-55, 23 grams of 1,4-butanediol, 20.8 grams of dimethylolpropionic acid were reacted with 64.3 grams of isophorone diisocyanate and 97.3 grams of hexamethylene diisocyanate in the presence of 37.4 grams of acetone at 70° C. for approximately 1.5 hours. 14.7 grams of triethylamine was then added to the prepolymer solution to neutralize the carboxylic acid groups in the prepolymer. The neutralized prepolymer was dispersed in 1146 grams of water using vigorous agitation and then immediately chain extended by adding a solution of 11.2 grams of ethylene diamine in 67 grams of water. A finely divided dispersion was formed having a solids content of 34.9%, a pH of 7.8 and a viscosity of 250 mPas.

Example 7-2 describes the preparation of an aqueous sulfonated polyurethane dispersion (PUDa1).

289 grams of Rucoflex™ XS-5483-55, 1.4 grams of 1,4-butanediol, 12.2 grams of dimethylolpropionic acid were reacted with 26 grams of isophorone diisocyanate and 39.2 grams of hexamethylene diisocyanate in the presence of 21.7 grams of acetone at 70° C. for approximately 1.5 hours. 9.2 grams of triethylamine was then added to the prepolymer solution to neutralize the carboxylic acid groups in the prepolymer. The neutralized prepolymer was dispersed in 860 grams of water using vigorous agitation and heated to 55° C. for approximately 2 hours. A finely divided dispersion was formed having a solids content of 28%, a pH of 7.5 and a viscosity of 850 mPas.

Example 7-3 describes the preparation of a aqueous non-sulfonated polyurethane dispersion (PUDb).

299.8 grams of Rucoflex™ S-105-55, 9.1 grams of 1,4-butanediol and 14.1 grams of dimethylolpropionic acid were reacted with 36.5 grams of isophorone diisocyanate and 55.2 grams of hexamethylene diisocyanate in the presence of 24 grams of acetone at 70° C. for approximately 1.5 hours. 15.5 grams of triethylamine was then added to the prepolymer solution to neutralize the carboxylic acid groups in the prepolymer. The neutralized prepolymer was dispersed in 766 grams of water using vigorous agitation and heated to 55° C. for approximately 2 hours. A dispersion was formed having approximately 5% settlement, a pH of 7.6 and a viscosity of 105 mPas.

Example 7-4 describes the preparation of a stable aqueous polyurethane using the method of the present invention (PUa–PUb).

100 grams of Rucoflex™ S-105-55, 3.03 grams of 1,4-butanediol and 4.7 grams of dimethylolpropionic acid were reacted with 12.1 grams of isophorone diisocyanate and 18.4 grams of hexamethylene diisocyanate in the presence of 8 grams of acetone at 70° C. for approximately 1.5 hours. The resulting isocyanate-terminated polyurethane prepolymer was neutralized with 5.2 grams of triethylamrine. The neutralized prepolymer was dispersed in 406 grams of the dispersion described in Example 1 (PUDa) and 255 grams of water then heated to 55° C. for approximately 1.5 hours. A finely divided dispersion was formed having a solids content of 34.9%, a pH of 7.6 and a viscosity of 115 mPas.

Example 7-5 describes the preparation of a stable aqueous polyurethane using the method of the present invention (PUa1–PUb).

100 grams of Rucoflex™ S-105-55, 3.03 grams of 1,4-butanediol and 4.7 grams of dimethylolpropionic acid were reacted with 12.1 grams of isophorone diisocyanate and 18.4 grams of hexamethylene diisocyanate in the presence of 8 grams of acetone at 70° C. for approximately 1.5 hours. The resulting isocyanate-terminated polyurethane prepolymer was neutralized with 5.2 grams of triethylamine. The neutralized prepolymer was dispersed in 406 grams of the dispersion described in Example 1 (PUDa) and 255 grams of water then heated to 55° C. for approximately 1.5 hours. The neutralized prepolymer was dispersed in 507 grams of the dispersion described in Example 7-2 (PUDa1) and 255 grams of water then heated to 55° C. for approximately 1.5 hours. A finely divided dispersion was formed having a solids content of 31.5%, a pH of 7.8 and a viscosity of 156 mPas.

Example 7-6 describes the blend of two non-reactive aqueous polyurethane dispersions which are not part of the present invention (PUDa+PUDb).

350 grams of the dispersion described in Example 7-1 (PUDa) was blended with 350 grams of the dispersion described in Example 7-3 (PUDb)

Example 7-7 describes the blend of two non-reactive aqueous polyurethane dispersions which are not part of the present invention (PUDa1+PUDb).

317 grams of the dispersion described in Example 7-2 (PUDa1) was blended with 317 grams of the dispersion described in Example 7-3 (PUDb)

The above examples have been depicted solely for the purpose of exemplification and are not intended to restrict the scope or embodiments of the invention. The invention is further illustrated with reference to the claims that follow thereto.

What is claimed is:

1. A stable one-component aqueous polyurethane dispersion comprising the reaction product of:
   a) at least one water dispersible isocyanate-terminated polyurethane prepolymer (A) comprising the reaction product of:
      i) at least one polyisocyanate;
      ii) at least one hydroxy carboxylic acid; and
      iii) at least one polymeric polyol, and
      iv) optionally, at least one sulfonated polyol
   b) at least one aqueous polyurethane dispersion (B);
   c) water;
wherein said reaction product is in the form of at least one of the structures selected from the group consisting of a grafted polymer, an interpenetrating network (IPN), a core/shell structure and mixtures thereof.

2. The stable one-component aqueous polyurethane dispersion according to claim 1 comprising about 20% to about 95% of the said water dispersible isocyanate-terminated polyurethane prepolymer based on the total solids.

3. The stable one-component aqueous polyurethane dispersion according to claim 1 comprising about 50% to about 90% of the said water dispersible isocyanate-terminated polyurethane prepolymer based on the total solids.

4. The stable one-component aqueous polyurethane dispersion according to claim 1 wherein the aqueous polyurethane dispersion (B) is the reaction product of:
   i) at least one isocyanate terminated polyurethane prepolymer;
   ii) at least one amine chain extender;
   iii) at least one alcoholamine chain terminator; and
   iv) optionally, water.

5. The stable one-component aqueous polyurethane dispersion according to claim 4 wherein the said polyurethane prepolymer (B)(i) is based on at least one different polyisocyanate, or at least one different polymeric polyol, or based on a different ratio of polyisocyanate/polyol as compared with those of polyurethane prepolymer (A).

6. The stable aqueous polyurethane dispersion according to claim 1, further comprising suitable crosslinking agents selected from the group consisting of water dispersible polyisocyanate, polyoxazolines, polycarbodiimide, polyaziridine, polyepoxy, polyurethane prepolymer and mixtures thereof.

7. The stable one-component aqueous polyurethane dispersion according to claim 1, wherein said aqueous polyurethane dispersion (B) comprises at least one active hydrogen atom selected from the group consisting of primary hydroxyl groups, secondary hydroxyl groups, primary amines, secondary amines and mixtures thereof.

8. The stable one-component aqueous polyurethane dispersion according to claim 1, wherein said polyisocyanate is selected from the group consisting of aliphatic polyisocyanates, aromatic polyisocyanates and mixtures thereof.

9. The stable one-component aqueous polyurethane dispersion according to claim 1, wherein said polyisocyanate is selected from the group consisting of hexamethylene diisocyanate, isophorone diisocyanate, tetramethylxylyene diisocyanate and mixtures thereof.

10. The stable one-component aqueous polyurethane dispersion according to claim 1, wherein said hydroxy carboxylic acid is dimethylolpropionic acid.

11. The stable one-component aqueous polyurethane dispersion according to claim 1, wherein said polymeric polyol is selected from the group consisting of polyester polyols, polyether polyols, polyesterether polyols, polycarbonate polyols, polyurethane-based polyols, polyacetal polyols, polyacrylic polyols, polycaprolactone polyols, polythioether polyols and mixtures thereof.

12. The stable one-component aqueous polyurethane dispersion according to claim 1, wherein said sulfonated polyester polyol is formed from 5-sulfoisophthalic acid monosodium salt, adipic acid and 1,6-hexanediol.

13. The stable one-component aqueous polyurethane dispersion according to claim 1, wherein the particle size distribution is in the range of about 40 nm to about 250 nm.

14. A method for the preparation of a stable aqueous polyurethane dispersion comprising the steps of:
   1) providing at least one water-dispersible isocyanate-terminated polyurethane prepolymer (A) comprising the reaction product of:
      i) at least one polyisocyanate;
      ii) at least one hydroxy carboxylic acid; and
      iii) at least one polymeric polyol, and
      iv) optionally at least one sulfonated polyol;
   2) providing at least one water-based polyurethane dispersion (B) comprising the reaction product of:
      i) at least one isocyanate terminated polyurethane prepolymer (B);
      ii) at least one amine chain extender;
      iii) at least one alcoholamine chain terminator; and
      iv) optionally, water;
   3) dispersing 1) in 2) and water under vigorous agitation to form a dispersion mixture;
   4) heating said dispersion mixture to a temperature of about 35 to about 95° C. to form a stable aqueous polyurethane dispersion substantially free of isocyanate.

15. The method according to claim 14 wherein said stable aqueous polyurethane dispersion is in the form of at least one of the structure selected from the group consisting of a grafted polymer, an interpenetrating network (IPN), a core/shell structure and mixtures thereof.

16. The method according to claim 14 wherein said polyurethane prepolymer (A) is added to water to prepare an aqueous polyurethane dispersion (A).

17. The method according to claim 14 wherein said polyurethane prepolymer (B) is dispersed in water and added to said polyurethane dispersion (A).

18. The method according to claim 14 wherein said polyurethane dispersion (B) is added to said polyurethane prepolymer (A) which further comprises water.

19. The method according to claim 14 wherein said dispersion (B) comprises at least one active hydrogen atom selected from the group consisting of primary hydroxyl groups, secondary hydroxyl groups, primary amines, secondary amines and mixtures thereof.

20. A stable aqueous polyurethane dispersion comprising a seed emulsion polymerization product comprising:
   a) at least one stable aqueous polyurethane dispersion according to claim 1; and
   b) at least one water-based polymer selected from the group consisting of acrylic polymer dispersions, vinyl polymer dispersions, vinyl-acetate-ethylene copolymer dispersions, polychloroprene dispersions, styrene emulsions, starch, dextrins, caseins, animal pectins, acid rosin esters and mixtures thereof;
wherein the aqueous polyurethane dispersion is used as seed for the polymerization of the water based polymer.

21. An article comprising the dispersion according to claim 1 wherein said dispersion at least one surface of the substrate, said substrate selected consisting of paper, metal, cloth and synthetic polymers.

* * * * *